L. ABADIE.
HOLDER FOR INSECTICIDES.
APPLICATION FILED MAY 8, 1917.
1,236,245. Patented Aug. 7, 1917.
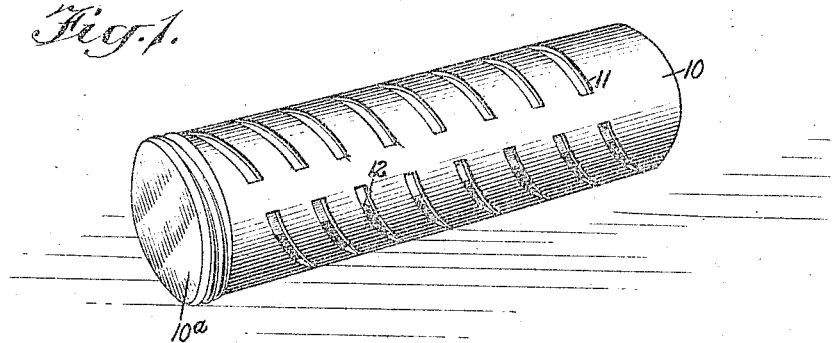
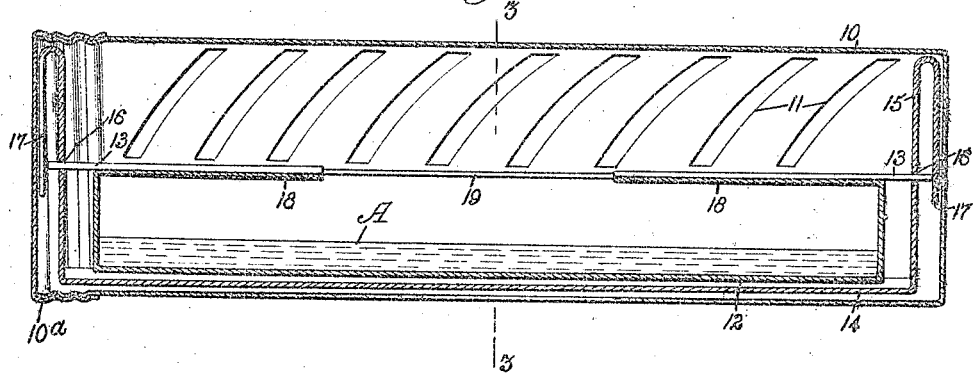
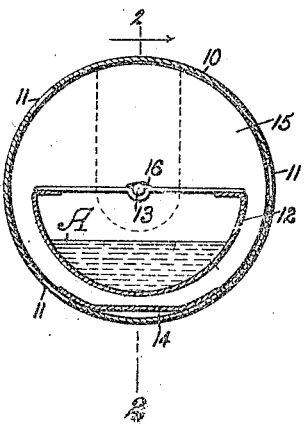
WITNESSES
INVENTOR
Louis Abadie
BY
ATTORNEYS

UNITED STATES PATENT OFFICE.

LOUIS ABADIE, OF ABBEVILLE, LOUISIANA.

HOLDER FOR INSECTICIDES.

1,236,245.   Specification of Letters Patent.   Patented Aug. 7, 1917.

Application filed May 8, 1917. Serial No. 167,130.

*To all whom it may concern:*

Be it known that I, LOUIS ABADIE, a citizen of the United States, and a resident of Abbeville, in the parish of Vermilion and State of Louisiana, have invented a new and Improved Holder for Insecticides, of which the following is a full, clear, and exact description.

My invention relates to a means to hold insecticides or an insect repelling substance, and a prime object of the invention is to produce a device for the indicated purpose in which poison may be safely placed and access to the same by children be made practically impossible.

Other objects of the invention, as well as the advantages thereof will be better understood from the particular description following.

Reference is to be had to the accompanying drawings forming a part of this specification in which similar reference characters indicate corresponding parts in all the views it being understood that the drawings are merely illustrative of one example of the invention.

Figure 1 is a perspective view of a holder embodying my invention;

Fig. 2 is an enlarged longitudinal vertical section thereof, the section being taken on the line 2—2, Fig. 3;

Fig. 3 is a transverse vertical section on the line 3—3, Fig. 2.

In carrying out my invention, a casing 10 is provided and preferably made cylindrical. Said casing has holes 11 produced therein and variously positioned.

The casing 10 is adapted to constitute a removable protective housing for a receptacle 12 adapted to hold a quantity of liquid poison indicated at A. The receptacle is rockably mounted above its center of gravity for which purpose it is formed with trunnions 13 which have bearings 16 in the ends 15 of a frame 14, said frame being adapted to be slid into and out of the casing 10 and preferably having such a form or fit relatively to the casing as to be held against turning. The material of the ends 15 of the frame 14 is return bent forming fingers 17 at each end at the outside of each end 15 to lie against the trunnions 13 and prevent displacement of the receptacle 12. The receptacle 12 is in the form of a trough running lengthwise with the casing 10 and with the said casing laid upon its side the receptacle will always hang vertically, suspended from its trunnions 13. Each end of the receptacle 12 is made in the form of a pocket by reason of a top 18 being provided, extending from each end toward the center. The top members 18, however, terminate short of the center, thereby leaving an opening 19 between the same. To charge the receptacle 12 with a liquid poison or the like the cap 10ᵃ of the receptacle is removed and the frame 14 withdrawn from the casing, the adjacent terminal 17 of the frame serving as a finger hold. The frame is then upended so that an end pocket thereof will be vertical, and the poison substance is poured into the pocket, after which the frame is replaced in the casing and the cover 10ᵃ restored. The holder may now be laid upon its side and it will be seen because of the overbalance produced by the receptacle 12, due to the friction exerted on its bearings the casing will be held against rolling, whereby it may be freely placed on a shelf without danger of rolling off. The cylindrical form of the casing provides a convenient form permitting a large number of openings 11 for the entrance of insects or for the escape of fumes or odors repellent to insects. Also, the holder may be rolled into places not readily accessible for the direct placing of the holder and may be removed from such inaccessible places by means of a stick for example. It will be seen that while the holder affords ready entrance of insects, the poison is not accessible to children since the housing constitutes a barrier except to insects. The danger of the poison being spilled is practically eliminated because in any position of the holder the receptacle serves to retain the poison.

Having thus described my invention I claim as new, and desire to secure by Letters Patent:

1. In a holder of the class described, a trough-like receptacle adapted to hold an insect poison or the like, the said trough having the ends thereof in the form of pockets disposed toward each other, the central portion of the receptacle being open at the top, a cylindrical container body adapted to be rolled over a floor or other supporting surface, and means pivotally supporting the receptacle above its center of gravity in the container.

2. In a holder of the class described, the combination of a frame, a receptacle ranging lengthwise of the frame and having trunnions turning in the ends of the frame, the material of the frame at the ends being return bent over the ends of the trunnions.

3. In a holder of the class described, a receptacle adapted to hold an insecticide or the like, a cylindrical protective housing removably containing the said receptacle and having openings therein for the admission of insects, and means mounting the receptacle at the ends thereof coaxial with the housing for relative turning movement, said cylindrical housing constituting the body of the device and adapted to be rolled over a supporting surface to position the device.

LOUIS ABADIE.